US006944318B1

(12) United States Patent
Takata et al.

(10) Patent No.: US 6,944,318 B1
(45) Date of Patent: Sep. 13, 2005

(54) FAST MATCHING SYSTEMS AND METHODS FOR PERSONAL IDENTIFICATION

(75) Inventors: Melvin M. Takata, Thousand Oaks, CA (US); Mohammed A. Khan, Simi Valley, CA (US); Michael Merman, Santa Monica, CA (US)

(73) Assignee: Citicorp Development Center, Inc., Los Angeles, CA (US)

( * ) Notice: Subject to any disclaimer, the term of this patent is extended or adjusted under 35 U.S.C. 154(b) by 0 days.

(21) Appl. No.: 09/483,561

(22) Filed: Jan. 14, 2000

Related U.S. Application Data

(60) Provisional application No. 60/116,115, filed on Jan. 15, 1999.

(51) Int. Cl.[7] ............................................... G08K 9/00
(52) U.S. Cl. ...................... 382/115; 340/5.83; 235/380
(58) Field of Search ................................ 382/115, 116, 382/117, 118; 235/380; 340/5.82, 5.83; 704/246, 273; 902/4, 25, 3; 351/200, 204; 359/2

(56) References Cited

U.S. PATENT DOCUMENTS

| | | | |
|---|---|---|---|
| 4,109,237 A | 8/1978 | Hill | 340/146.3 E |
| 4,641,349 A | 2/1987 | Flom et al. | 382/2 |
| 4,975,969 A | 12/1990 | Tal | 382/2 |
| 5,016,282 A | 5/1991 | Tomono et al. | 382/2 |
| 5,067,162 A | 11/1991 | Driscoll, Jr. et al. | 382/5 |
| 5,291,560 A | * 3/1994 | Daugman | 382/117 |

(Continued)

FOREIGN PATENT DOCUMENTS

| | | | | |
|---|---|---|---|---|
| WO | WO 94/09446 | 4/1994 | | G06K/9/00 |
| WO | WO 97/17674 | 5/1997 | | G06T/7/00 |
| WO | WO 97/46978 | 12/1997 | | G07C/9/00 |

OTHER PUBLICATIONS

Sladek, Sarah L., "More Than Meets the Eye—New Jersey–Based Company Pioneers Iris Identification System" <online>, <retrieved on Aug. 5, 1999>, 2 pp., Retrieved from the Internet: http://www.finance–commerce.com/daily/NEWS/D31sen~1.htm.

(Continued)

*Primary Examiner*—Samir Ahmed
(74) *Attorney, Agent, or Firm*—George T. Marcou; Kilpatrick Stockton LLP

(57) ABSTRACT

Systems and methods for personal identification, preferably based on iris identification, include a camera for acquiring a presented image of a presented individual and a computer device for converting the presented image into a presented image metric. The computer device also compares the presented image metric to a predetermined arrangement of a plurality of reference image metrics of known individuals to identify the presented individual as one of the known individuals. The presented image metric and the plurality of reference metrics are both formatted to represent detailed physical characteristics of the individuals, including iris characteristics and other physical characteristics. Further, the plurality of reference image metrics may also be formatted to represent user-defined characteristics, which include non-image-related characteristics. The predetermined arrangement of the plurality of reference image metrics are ordered to provide a fast match with the presented image metric. As such, the predetermined arrangement may be based on iris characteristics, other physical characteristics and user-defined characteristics. Alternately, the system of the present invention may include a carousel system that presents a circulating, predetermined arrangement of a series of reference image metrics that are compared with a plurality of presented image metrics in parallel. Thus, the systems and methods provide a fast match determination between the presented image metric and the plurality of reference image metrics in order to identify the presented individual.

15 Claims, 2 Drawing Sheets

U.S. PATENT DOCUMENTS

| | | | | |
|---|---|---|---|---|
| 5,353,233 | A | | 10/1994 | Oian et al. ................... 364/485 |
| 5,386,104 | A | | 1/1995 | Sime .......................... 235/379 |
| 5,428,357 | A | | 6/1995 | Haab et al. ................... 341/155 |
| 5,471,542 | A | | 11/1995 | Ragland ...................... 382/128 |
| 5,539,841 | A | | 7/1996 | Huttenlocher et al. ....... 382/218 |
| 5,561,718 | A | | 10/1996 | Trew et al. .................. 382/118 |
| 5,572,596 | A | | 11/1996 | Wildes et al. ................ 382/117 |
| 5,712,912 | A | | 1/1998 | Tomko et al. ................. 380/23 |
| 5,717,512 | A | | 2/1998 | Chmielewski, Jr. et al. 359/210 |
| 5,719,950 | A | | 2/1998 | Osten et al. ................. 382/115 |
| 5,751,836 | A | | 5/1998 | Wildes et al. ................ 382/117 |
| 5,873,832 | A | | 2/1999 | Maloney et al. ............. 600/473 |
| 5,901,238 | A | | 5/1999 | Matsushita ................... 382/117 |
| 5,910,988 | A | | 6/1999 | Ballard ......................... 380/24 |
| 5,973,731 | A | * | 10/1999 | Schwab ....................... 348/161 |
| 6,119,096 | A | * | 9/2000 | Mann et al. .................. 382/117 |
| 6,418,235 | B1 | * | 7/2002 | Morimoto et al. .......... 382/118 |

OTHER PUBLICATIONS

Sandler, Gregory, "Iris Identification Emerges as Mainstream Biometric Screening Tool" <Online>, Copyright 1997 <retrieved on Aug. 4, 1999>, 3 pp., Retrieved from the Internet: http://www.eyeworld.org/may98/999.html.

"Bank United News" <online>, <retrieved on Jul. 28, 1999>, 1 p., Retrieved from the Internet: http://www.dobi.com/news_boa.htm.

"Oki Debuts Revolutionary New Personal Identification System at Meeting of Forensic Scientists" <online>, Aug. 27, 1996 <retrieved on Jul. 28, 1999>, 1 p., Retrieved from the Internet: http://www.oki.co.jp/OKI/Home/English/New/OKI-News/1996/z9630.html.

"About Sensar—The Company At a Glance" <online>, <retrieved on Jul. 28, 1999>, 3 pp., Retrieved from the Internet: http://www.scott.net/~dg/64.html.

Wilson, Jim, et al., "Your Eye Holds the Key to the World's Most Secure Identification System" <online>, Aug., 1998 <retrieved on Jul. 27, 1999>, 3 pp., Retrieved from the Internet: http://www.popularmechanisms.com/popmech/sci/9808EFCOCM.html.

Wildes, R.. P., et al., "A System for Automated Iris Recognition," *IEEE Publication,* 1994 Workshop, pp. 121–128.

Daugman, John G., "High Confidence Visual Recognition of Persons by a Test of Statistical Independence," *IEEE Transactions on Pattern Analysis and Machine Intelligence*, vol. 15, No. 11, pp. 1148–1161, Nov., 1993.

* cited by examiner

FAST MATCHING SYSTEMS AND METHODS FOR PERSONAL IDENTIFICATION

CROSS-REFERENCE TO RELATED APPLICATIONS

This application claims the benefit of U.S. Provisional Application No. 60/116,115 filed Jan. 15, 1999.

BACKGROUND OF THE INVENTION

This invention relates generally to personal identification, and more particularly, to fast matching systems and methods of personal identification using iris information.

There has always been a need for personal identification. With the advances in technology, there is a desire to make the process of personal identification as streamlined as possible by increasing the efficiency and reliability of the methods. Traditional identification methods of requiring identification cards, passwords, codes, etc., are deemed cumbersome and outdated. Thus, there is a desire to take advantage of automated technology to determine a person's identity.

Efforts have been made to utilize biometric information to determine a person's identity. Examples of such efforts include utilizing fingerprints, retinal scans and iris scans. Many of such efforts have focused on verifying, as opposed to identifying, a person's identity. Verifying an identity is a relatively easier situation. With verification, an individual claims a certain identity and then the identification system compares the identification information of the individual with a stored set of identification information for the person they claim to be. This is a one-to-one comparison. Thus, the system merely needs to find the claimed identification information set and compare it to the set of identification information supplied by the individual making the claim.

On the other hand, pure identification is a more difficult problem as the individual does not first make a claim as to their identity, but the system must ascertain it. In this case, the system must compare the identification information supplied by the individual with a large database comprising the identification information of individuals in a large population. This is known as a one-to-many comparison. Thus, the identification of an individual is relatively much more difficult than the verification of an individual's identity.

For example, U.S. Pat. No. 4,641,349 discloses an iris recognition system. The system illuminates an eye, obtains an image of the iris and pupil of the eye, and compares the obtained image with stored image information to identify the eye. Further, the system illuminates the eye to drive the pupil of the eye to a predetermined size, which may then be compared with stored image information from an eye with the same pupil size. The system compares visible features of the iris such as pigment-related features, to stored images of irises to make an identification. The comparison methods identified by this patent include comparing pixel-by-pixel images of two eyes, optical signal processing, and a method in which visual features such as pigment spots are compared between two images. No method is identified, however, for maximizing the efficiency of this comparison.

Similarly, U.S. Pat. No. 5,291,560 discloses a biometric personal identification system based on iris analysis. This system acquires a live video of a person's iris and encodes its texture into a compact signature, or iris code. A coordinate system is utilized to identify portions of the iris, and the iris information from the coordinate system is converted into a 256byte iris code. The iris code has a universal mathematical format and constant length, allowing comparisons between codes using logical operations to determine iris identification. The comparison results in a similarity metric that positively establishes, confirms, or disconfirms the identity of any individual and establishes a confidence level associated with any such identification decision.

None of the prior art, however, identifies techniques for increasing the likelihood of finding a match at the earliest point possible in the comparison process. As such, methods are desired to increase the speed of the identification process.

SUMMARY OF THE INVENTION

Fast matching systems and methods for personal identification, preferably based on iris identification, include a camera for acquiring a presented image of a presented individual and a computer device for converting the presented image into a presented image metric. The computer device also compares the presented image metric to a predetermined arrangement of a plurality of reference image metrics of known individuals to identify the presented individual as one of the known individuals. The presented image metric and the plurality of reference metrics are both formatted to represent detailed physical characteristics of the individuals, including iris characteristics and other physical characteristics. Further, the plurality of reference image metrics may also be formatted to represent user-defined characteristics, which include non-image-related characteristics. The predetermined arrangement of the plurality of reference image metrics are ordered to provide a fast match with the presented image metric. As such, the predetermined arrangement may be based on iris characteristics, other physical characteristics and user-defined characteristics. Alternately, the system of the present invention may include a carousel system that presents a circulating, predetermined arrangement of a series of reference image metrics that are compared with a plurality of presented image metrics in parallel. Thus, the systems and methods provide a fast match determination between the presented image metric and the plurality of reference image metrics in order to identify the presented individual, for example, to allow the presented individual access to a secure system or area.

According to an embodiment of the present invention, a fast matching system for personal identification includes an image acquiring device and a computing device. The image acquiring device obtains a presented image of an individual, preferably including a presented iris, and forwards the presented image data to the computing device. The computing device converts the presented image data into a presented image metric and attempts to match the presented image metric with a predetermined arrangement of stored image metrics from a stored image metric database in order to identify the individual. For example, the predetermined arrangement of stored image metrics may be based on an ordered search of the database. The ordered search may comprise a number of different formats, depending on the requirements of the owner of the system.

The ordered search utilizes a selected set of image data comprising a subset of the entire database of stored image data. The data set to be searched is determined by concentrating on predetermined factors that increase the likelihood of finding a match early in the match determination process. The ordered search, for example, may focus on a characteristic of the iris, a characteristic of the individual, or some other user-defined characteristic determined by the owner of the system to enhance the identification speed of the system.

According to another embodiment of the present invention, a fast matching system for personal identification is based upon binning the image data. The method of binning the image data from the acquired image and the stored images involves finding distinctive portions of the image data that consistently provide a match. The distinctive portions of the image data are utilized to sort the image data of the stored irises into different bins. The distinctive portion of the acquired image is utilized to find bins containing stored data images with similar distinctive portions, thereby increasing the likelihood of finding a match.

According to yet another embodiment of the present invention, a fast matching system for personal identification includes a carousel device for presenting a plurality of stored images at one time. The carousel device is analogous to a rotating carousel of stored iris images that allows the images to be viewed through a plurality of windows at one time, thereby enabling a plurality of comparisons to be performed in parallel.

DETAILED DESCRIPTION OF THE INVENTION

Figure 1:
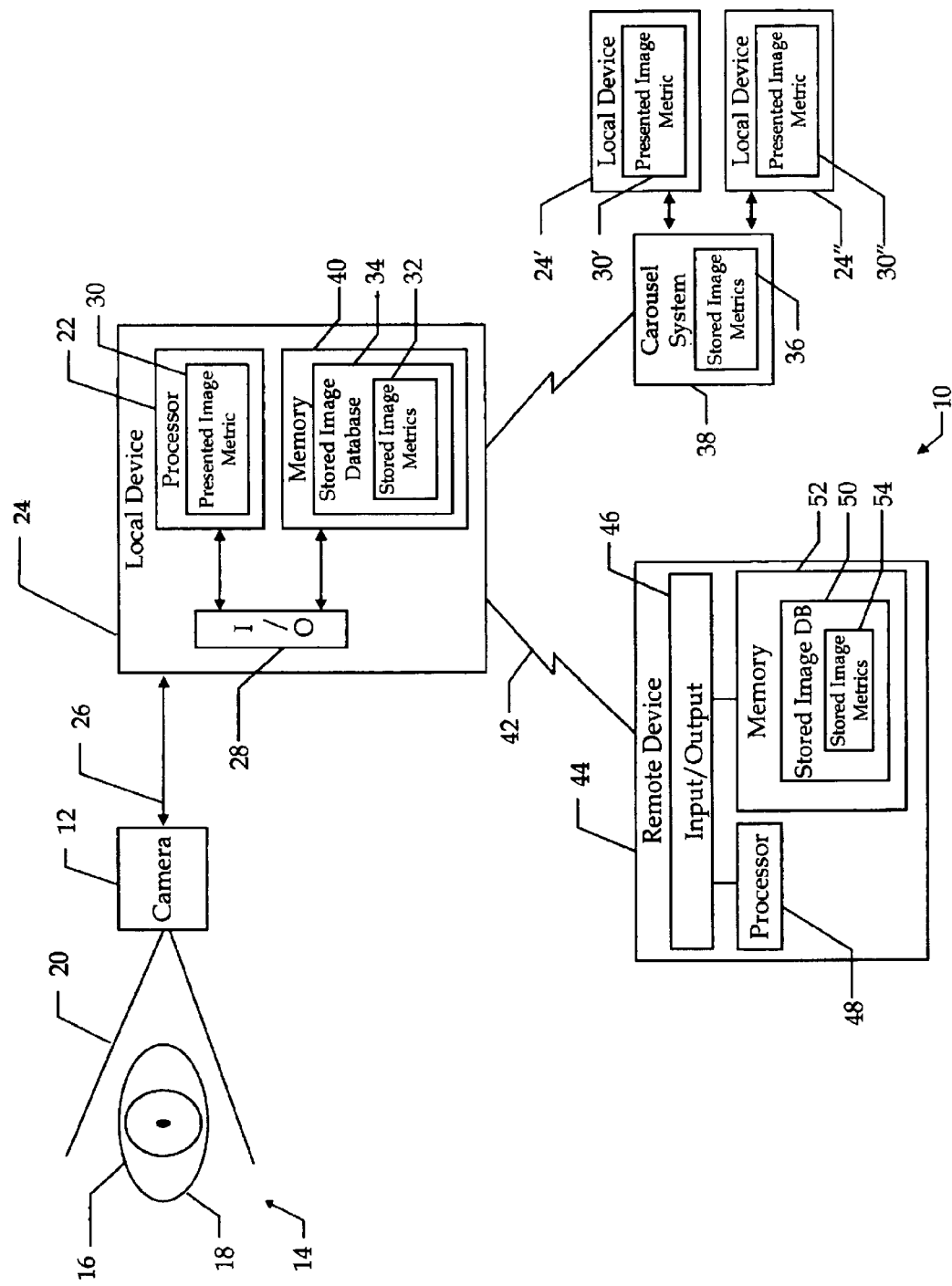
FIG. 1 is a schematic diagram of one embodiment of a system of the present invention.
Figure 2:
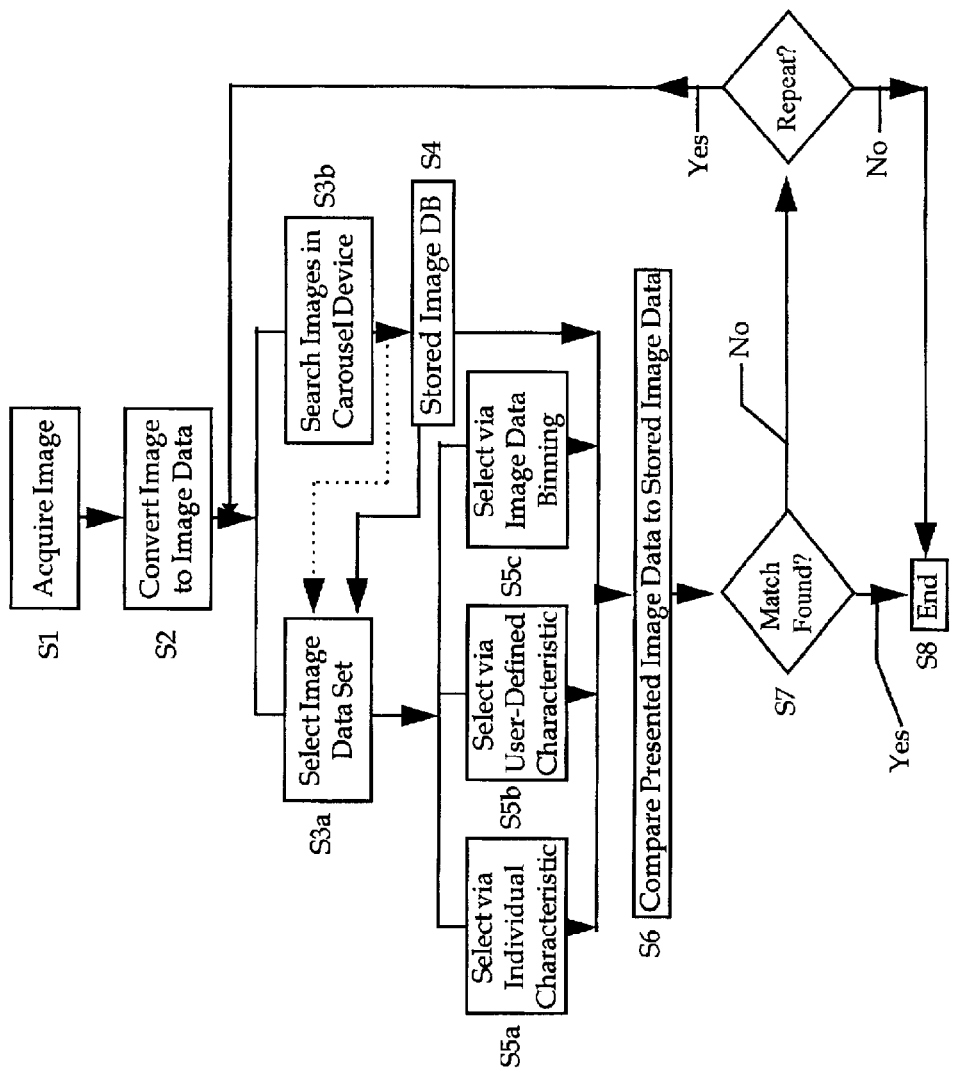
FIG. 2 is a flow chart of one embodiment of a process of the present invention.

Referring to FIGS. 1 and 2, according to a preferred embodiment of the present invention, a fast matching system 10 for personal identification comprises a camera 12 that acquires a presented image 14, such as an iris 16 of an eye 18 of an individual (not shown) that is within its field of view 20 (FIG. 2, S1). A processor 22 within a local computer device 24 receives signal 26, representing iris 16 and other physical characteristics of the individual, through input/output 28 and the processor converts the signal into a presented image metric 30, which is in a readily analyzable format (S2). The presented image metric 30 is then compared to data representing reference images of known individuals or stored image metrics 32, representing reference images of known individuals, accessed from a stored image database 34 in order to determine the identity of the presented individual (S4, S6). The stored image metrics 32 may comprise a set of image metrics grouped together based on certain individual, user-defined or binned characteristics (S3a, S5a–c). Alternatively or in conjunction with the above comparison, the presented image metric 30 may be compared to stored image metrics 36 from a carousel system 38 that provides a concurrent comparison of a plurality of presented image metrics (30',30") from other local computer devices 23', 23" with a predetermined arrangement of each of a series of the stored image metrics 36 (S3b). Additionally, the presented image metric 30 may be compared with stored image metrics 32 stored locally, such as within memory 40 of local device 24, or processor 22 may communicate 42 with a remote computer device 44. The remote computer device 44 may have an input/output 46, a processor 48 and a stored image metric database 50, within memory 52. The remote device 44 may have the capability to contain more stored image metrics 54 than the local stored image database 34. If a match is not found, then the system 10 may return to the step of selecting a set of stored image metrics, searching stored image metrics in the carousel device, or ending the identification process (S7, S8). If an identification is found, the system ends the identification process (S8).

Camera 12 may be any type of image gathering device. System 10 may additionally utilize camera 12 to detect features of the individual other than their iris 16. For example, camera 12 may have a field of view 20 large enough to find portions of an individual's body, such as the head, while still being able to focus in on eye 18 and then iris 16. System 10 may advantageously utilize field of view 20 of camera 12 to detect individual physical characteristics, such as hair color, skin tone, facial characteristics, etc. Alternatively, camera 12 may comprise a plurality of cameras, such as a Wide Field of View (WFOV) camera and a Narrow Field of View (NFOV) camera in order for system 10 to capture both individual characteristics and iris characteristics. Thus, camera 12 in combination with system 10 is able to ascertain general distinctive individual physical characteristics as well as identify and focus in on the distinctive characteristics of iris 16 of a presented individual.

The presented image metric 30 comprises data formatted to represent detailed physical characteristics of presented image 14, which may include data formatted to represent general individual physical characteristics, as described above. Data representing presented image 14 and individual characteristics are preferably converted into a digital data format or presented image metric 30 that accurately reflects the various image features and characteristics in a consistent and repeatable manner. The data format or presented image metric 30 allows for quick analytical comparison of data representing the presented image 14 to data or a stored image metric representing a reference image. Data for reference or stored images 32, 36, 54 are acquired and entered in the stored image database 34, 50 during a secure process that reliably identifies the reference individual. The various descriptive features or characteristics of presented image 14, such as the contours of the iris 16 of an eye 18, are converted into the data format of the image metric such that two independent images having similar features have the corresponding portions of their data formatted similarly. Thus, the presented image metric 30 is compared to a previously acquired and verified stored image metrics 32, 36, 54 in order to determine the identity of an individual.

System 10 may allow an identity determination based on a plurality of different match determination methods. One embodiment of a match determination method comprises an ordered search. The ordered search utilizes a selected set of the stored image metrics 32, 36, 54 comprising a subset of the entire stored image metric database 34, 50. These subsets of the entire database 34, 50 may be separately stored in the remote device 44 or the local device 24. The subset to be searched is determined by sorting the entire stored image metric database 34, 50 based on portions of the data format or image metric that represent a selection of distinctive characteristics that are either a part of the stored image metric or that are associated with the stored image metric. These distinctive characteristics increase the likelihood of finding a match early in the match determination process. The ordered search, for example, may focus on individual characteristics, user-defined characteristics, or binned image metric characteristics to enhance the identification speed of the system 10.

The individual characteristics may include, for example, features like the hair color, skin tone, and distinctive facial characteristics of an individual. These characteristics may be captured by the camera 12 and form the primary portion of the presented image metric 30 and the stored image metrics 32, 36, 54. For example, one primary individual characteristic preferably comprises an iris 16 of an individual. Utilizing the iris 16 for identification is desirable because, like a fingerprint, each iris is unique. Additionally, iris identification is advantageous in thwarting impostors because it is risky to alter the contour of the iris 16. Thus, the difficulty of creating an impostor image increases the security level of an iris identification.

The presented image metric 30 represents the contours and pigmentation of the iris 16, as well as other general individual physical characteristics, and can be quickly compared to stored image metrics 32, 36, 54 to make an identification determination. A plurality of individual physical characteristics may be combined into and represented by the presented image metric 30 to aid the fast matching ability of the system 10. Also, individual physical characteristics that most humans use to identify other humans may be utilized to quickly determine a subset of stored image database 34, 50 to search. For example, a subset may comprise stored image metrics 32, 36, 54 of individuals with brown eyes, light brown skin and dark brown hair, and possibly some other distinctive iris characteristic.

Similarly, the ordered search may comprise other user-defined characteristics that are not related to an individual's appearance. The user-defined characteristics may make up a portion of the presented image metric 30 and the stored image metrics 32, 36, 54. Alternatively, the user-defined characteristics may just be associated with or linked to the image metrics 32, 36, 54. These user-defined characteristics may be initially established at the same time that the reference or stored image metric is securely entered into the database, and/or updated periodically. Also, these user-defined characteristics may provide subsets of stored images 34, 36, 54 based upon geography, memberships, affiliations, or individual habits. For example, the system 10 may perform an ordered search first from a subset of stored image metrics 32, 35, 54 of the last 500 individuals to utilize the system; then all individuals with addresses within a certain radius of the system; then all individuals who are a member of a specified or predetermined banking program; and then all individuals with bank balances over a certain minimum amount, etc. For example, these type of user-defined characteristics allow the owner of the system 10, such as a bank, to provide a perk to its best customers by insuring that they wait the least amount of time for an identification. As mentioned above, the processor 22 of the local device 24 may provide the subsets of stored image data or metrics 32; 36, 54 by running a software program to extract the subsets from stored image database 34, 50. Alternately, the subsets may be directly stored in the local or remote database 34, 50 or generated by a processor 48 associated with the remote device 44. Further, these types of user-defined characteristics allow the system 10 to be individually tailored to define how a match determination is performed in order to best suit particular needs.

Additionally, an ordered search may comprise performing a search based on binning the stored image metrics 32, 36, 54 based on certain distinctive characteristics. Similar to above, this binning may occur within local device 24 or may be provided by the remote device 44. Typically, in two independent image sample acquisitions of the identical image, the resultant image metric in each case is not exactly identical. There is generally some degree of difference between the two image metrics due to the varying conditions of each acquisition and because of inherent error in the technique. This is especially true for images of individual irises. For example, if an iris comprises a digital image of 2000 bits, then in order to determine a good match only about 75% of the bits need to match. Out of the 75% of the bits that do match, there is a smaller percentage of bits that reliably match each time an image sample is acquired. The binning technique of the present invention identifies and utilizes the smaller, reliable number of bits that produce the match and bins the stored image metrics 32, 36, 54 according to these bits. When an image of a reference iris is initially acquired and verified, a number of samples of the iris are taken and the resulting image metrics are compared to determine the bits that each sample have in common. These bits are then identified and utilized to classify and bin the stored image metric. When a presented image 14 is acquired, a number of samples are taken, the common bits are identified, and these common bits or some subset of them are utilized to select a bin to begin the match determination process.

This binning technique may have multiple embodiments. For example, the stored image metrics 32, 36, 54 may be partitioned into multiple overlapping bins, where some number of bits that characterize each stored image metric are used to determine the bins. Each presented image metric 30 maps to a single bin. Some stored image metrics 32, 36, 54 may reside in multiple bins. Thus, if a match exists, the match is guaranteed to be in the bin.

Alternatively, the binning technique may partition the stored image metrics 32, 36, 54 into multiple, non-overlapping bins. The unique bins in this case are determined by some number of bits that characterize the image metric. Each presented image metric maps to a small fraction of the total number of bins and these bins are then used in performing the matching search.

Further, a dynamic binning technique may be utilized. Dynamic binning utilizes images provided by a WFOV and a NFOV camera. Alternatively, and as described above, a single camera 12 with WFOV and NFOV capabilities may be utilized. When an individual's reference or stored image metric is securely obtained, both an image of their face and an iris image are captured and stored as the reference image metric. Then, in the later identification process, the system 10 of the present invention captures the presented image 14, including an image of the individual's face, using the WFOV camera to capture the general individual characteristics as described above. The general individual characteristics form a portion of the presented image metric 30, and a subset of possible matching stored image metrics 32, 36, 54 is obtained by comparing this portion of the presented image metric with the stored image metric database 34, 50. For each possible matching stored image metric, a confidence factor can be assigned to each possible matching stored image metric based on how close the presented individual characteristics match the stored individual characteristics. Then, the NFOV camera captures the individual's iris 16 and the system 10 generates the remainder of the presented image metric 30. The presented image metric 30 is then compared to the subset of possible matching stored image metrics, based on general individual characteristics, to make an identification based on the iris characteristics. Thus, the system 10 limits the search to only the subset of stored image metrics having individual characteristics in common with the presented individual. This technique is advantageous because a face can be captured much more quickly than an iris, which allows the stored image database 34, 50 to be searched based on individual characteristics while the iris capture is completed.

Thus, as discussed above, the ordered search techniques of the present invention help to immediately narrow down the search field to the subset of stored image metrics 32, 36, 54 that is most likely to contain a match. Therefore, the ordered search techniques immediately eliminate searching through and comparing stored image metrics 32, 36, 54 that have distinctive characteristics that obviously do not match the distinctive characteristics of the presented image metric 30.

Another embodiment of a match determine method comprises comparing the presented image metric 30 to stored image metrics 36 in a carousel system 38. The carousel system 38 advantageously provides a plurality of access points to a high speed, constantly circulating database of stored image metrics 36. The carousel system 38 may be defined by software in the processor 22, the remote storage device 44 or a combination or plurality of both, to enable the high speed presentation of a predetermined arrangement of a series of stored image metrics 36. Alternatively, as opposed to a software-controlled carousel system 38, multiple special purpose hardware devices may perform the carousel matching in hardware, each comprising a maximum number of stored image metrics 36 in its buffer. The carousel system 38 economically allows numerous match determinations to be performed simultaneously. For example, there may be a network of local devices 24', 24", such as ATM's, that utilize system 10 for identification purposes. Each ATM, and thus each system 10, may be networked to remote storage device 44. This arrangement may be necessary or desirable, for example, when the entire stored image metric database is only stored in one place or is too expensive to store locally. The carousel system 38 presents the stored image metrics 36, one at a time, to all the access points or windows in the same order rather than having an individual search done for each presented image metric 30', 30". The carousel system 38 may present the entire stored image database in series, or the carousel system may present subsets of the entire stored image database, as discussed above. While each individual match determination for each of the plurality of presented images 30', 30" may not be customized, the carousel system 38 beneficially increases the combined efficiency and reduces the total time of performing a match determination for the plurality of presented images. In effect, the carousel system 38 allows for a plurality of systematic match determinations to be performed in parallel, as opposed to a plurality of match determinations to be performed in series. Thus, utilizing the carousel system 38 is another way to improve the efficiency and speed of the fast matching identification system of the present invention.

Further, once the presented image metric 30 is compared to the stored image metrics 32, 36, 54, a measurement of the degree of similarity between metrics is generated by processor 22. For example, the measurement may compare the two metrics on a bit-by-bit basis and (1) total the number of bits that match identically and/or (2) identify the bits that match. This measurement may be utilized in a decision to determine whether the presented image metric 30 is similar enough to the selected stored image metric to be considered a match and thereby identify the individual. If no match is found, the system 10 may return to the step of selecting a subset of image metrics, performing a carousel search, or ending the process with a determination that the individual cannot be identified. If the measurement leads to a decision that the match is sufficient, then the process ends with the identification of the individual, for example, to allow the individual access to a secure system or area.

Thus, the present invention provides a fast matching system for personal identification that utilizes a number of methods to insure that an identification is made in the shortest possible time, within the order of a few seconds, and with a high degree of reliability. In summary, the method in a computer system for identifying a presented individual includes acquiring an image of at least a presented iris of the presented individual. The image is converted into a presented image metric, wherein the presented image metric represents at least one characteristic of the presented iris. A match determination is performed between the presented image metric and a selected one of a plurality of reference metrics in a predetermined arrangement from an reference metric database. Each of the plurality of reference metrics represents at least one characteristic of a reference iris of a known individual. The identification and match determination process may include comparing at least one characteristic of the presented image with a corresponding characteristic of at least one of the predetermined arrangement of the plurality of reference metrics. The identification of the presented individual may further include measuring the degree of similarity between the presented image metric and a selected one of the plurality of reference metrics, comparing the measured degree of similarity with a predetermined similarity threshold, and thereby identifying the presented individual as a specific one of the plurality of known individuals corresponding to the selected one of the plurality of reference metrics if the measured degree of similarity is equal to or greater than the predetermined similarity threshold.

The predetermined arrangement of reference metrics may be a subset of the plurality of reference metrics in the database. Also, the predetermined arrangement of the plurality of reference metrics may be based on iris characteristics, other physical characteristics and user-defined or non-image-related characteristics or combinations of some or all of these characteristics. Additionally, the predetermined arrangement may be based on binning the reference metrics or stored image metrics. Further, the method may include and the predetermined arrangement may be determined by a dynamic binning of the plurality of reference metrics. Additionally, the predetermined arrangement of reference metrics may include a circulating presentation of each of the plurality of reference metrics that allows a concurrent match determination for a plurality of presented image metrics.

The method may further include classifying the presented image metric based on the at least one characteristic of the presented iris, where each reference metric within the predetermined arrangement has a corresponding classification for the at least one characteristic of the reference iris of the known individual.

The method may further include formatting the presented image metric to further represent a plurality of characteristics of at least the presented individual. At least one of the plurality of characteristics of the presented individual are classified. Also, each of the plurality of reference metrics are formatted to further represent a plurality of characteristics of the known individual. And, at least one of the plurality of characteristics of each of the plurality of known individuals is classified. Then, the presented image metric is compared with at least one reference metric from a subset of the plurality of reference metrics to identify the presented individual, where the subset is determined by sorting each of the plurality of reference metrics by at least one predetermined classification corresponding to one of the plurality of characteristics of the presented image metric.

In summary, a computer system for identifying a presented individual includes a camera operable for capturing a presented image of the presented individual and outputting presented image data representing the presented image, where the presented image includes a plurality of classifiable characteristics of the presented individual including a presented physical characteristics of the presented individual and at least one characteristic of a presented iris of the presented individual. The system further includes a reference image database having a plurality of reference metrics, where each of the plurality of reference metrics represents a reference image of at least a portion of one of a plurality of known individuals. Each of the plurality of reference metrics includes a plurality of classifiable reference characteristics of the known individual including physical characteristics of the known individual, at least one characteristic of a reference iris of the known individual and at least one user-defined characteristic of the known individual. Additionally, the system includes a processor in communication with the memory and operable to receive the presented image data, the processor a operable to run a program to convert the presented image data to a presented image metric having the plurality of classifiable characteristics of the presented individual. The program further is operable to retrieve at least a predetermined arrangement of the plurality of reference metrics, where the program generates an identification signal to identify the presented individual as one of the plurality of known individuals if a match is found between the presented image metric and one of the predetermined arrangement of reference metrics.

Although the invention has been described and illustrated in detail, it is to be clearly understood that the same is intended by way of illustration and example only and is not to be taken by way of limitation. For example, any of the above methods of match determination, or a combination thereof, may be used by system 10. Accordingly, variations and modifications of the present invention will be apparent and the following claims are intended to cover all such modifications and equivalents.

What is claimed is:

1. A computer system for identifying a presented individual represented at least in part by presented image data, comprising:
    a memory having a plurality of reference metrics, wherein each of the plurality of reference metrics represents a reference image of at least a portion of one of a plurality of known individuals, and wherein each of the plurality of reference metrics includes at least one classifiable reference characteristic of the reference image;
    a processor in communication with the memory and operable to receive the presented image data, the processor operable to run a program to convert the presented image data to a presented image metric having at least one classifiable characteristic of the presented individual, the program further operable to retrieve at least a predetermined arrangement of the plurality of reference metrics, wherein the program generates an identification signal to identify the presented individual as one of the plurality of known individuals if a match is found between the presented image metric and one of the predetermined arrangement of reference metrics.

2. The system of claim 1, wherein the predetermined arrangement is based on the at least one classifiable characteristic of the presented image metric.

3. The system of claim 2, wherein the at least one classifiable characteristic of the presented image metric comprises a physical characteristic of the presented individual.

4. The system of claim 3, wherein the physical characteristic is selected from a group consisting of a facial characteristic, hair color, skin tone and an iris characteristic.

5. The system of claim 2, wherein the at least one classifiable characteristic of the presented image metric comprises a characteristic of a presented iris of the presented individual.

6. The system of claim 1, wherein the predetermined arrangement is based on a user-defined characteristic of each of the plurality of reference metrics.

7. The system of claim 6 wherein the user-defined characteristic comprises a non-image-related characteristic of each of the plurality of known individuals.

8. The system of claim 7, wherein the non-image-related characteristic is selected from the group consisting of a geographical characteristic, an affiliation characteristic and an individual habit characteristic.

9. The system of claim 1, wherein the predetermined arrangement is a selected subset of the plurality of reference metrics based on an ordered search of the plurality of reference metrics.

10. The system of claim 1, wherein the at least one classifiable characteristic of the reference image includes a non-image-related characteristic of each of the plurality of known individuals, and wherein the predetermined arrangement is based on a combination of the at least one classifiable characteristic of the presented image metric and the non-image-related characteristic of each of the plurality of known individuals.

11. The system of claim 1, wherein the predetermined arrangement is based on a combination of a characteristic of a presented iris of the presented individual, another one of a physical characteristic of the presented individual and a non-image-related characteristic of each of the plurality of known individuals.

12. The system of claim 1, wherein the predetermined arrangement comprises binning the plurality of reference metrics based on the at least one classifiable reference characteristic of the plurality of known individuals such that reference metrics having similar reference characteristics are arranged in the same bin.

13. The system of claim 1, further comprising a carousel program within the processor, wherein the carousel program is operable for concurrently determining a match between a plurality of received presented image metrics and the plurality of reference metrics, wherein each of the plurality of presented image metrics represents at least one characteristic of a presented image of one of a plurality of presented individuals, and wherein the predetermined arrangement comprises a circular presentation of the plurality of reference metrics, and wherein the carousel program generate an identification signal to identify each of the plurality of presented individuals as one of the plurality of known individuals if a match is found between one of the plurality of presented image metrics and one of the plurality of reference metrics.

14. The system of claim 1, further comprising a camera operable for capturing the presented image of the presented individual and outputting the presented image data representing the presented image.

15. The system of claim 1, further comprising a secure system having restricted access, wherein the identification signal is receivable by the secure system for determining access.

* * * * *